Feb. 11, 1941.   M. W. SEYMOUR   2,231,685
PHOTOGRAPHIC COLOR PROCESS AND FILM FOR USE THEREIN
Filed Oct. 3, 1936
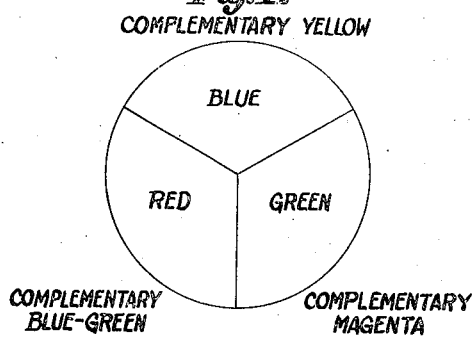
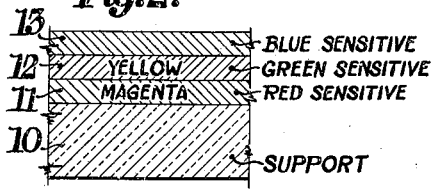
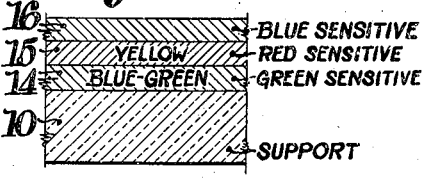
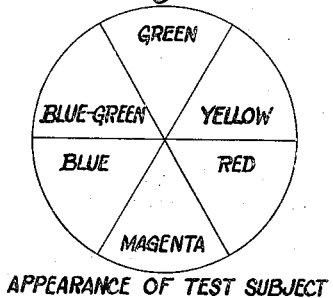
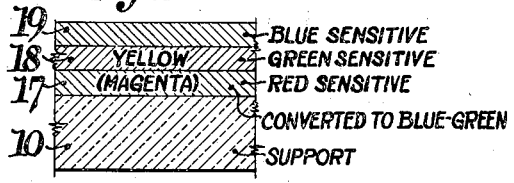
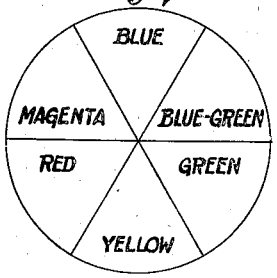
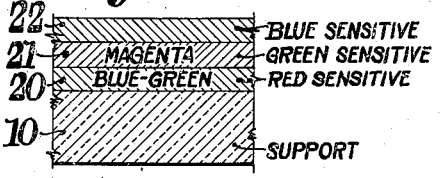
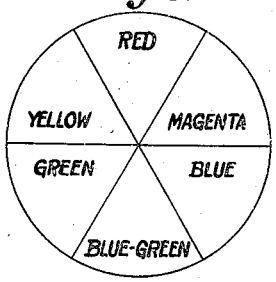
Merrill W. Seymour,
INVENTOR:
BY Newton M. Perkins,
Reginald F. Smith,
ATTORNEYS.

Patented Feb. 11, 1941

2,231,685

UNITED STATES PATENT OFFICE 2,231,685

PHOTOGRAPHIC COLOR PROCESS AND FILM FOR USE THEREIN

Merrill W. Seymour, Rochester, N. Y., assignor to Eastman Kodak Company, Rochester, N. Y., a corporation of New Jersey Application October 3, 1936, Serial No. 103,889

6 Claims. (Cl. 95—2)

This invention relates to color photography and more particularly to a method for obtaining prints in natural colors.

In natural color photography the subtractive method is widely used. In one type of subtractive method a film is employed with three layers sensitized respectively for the three primary colors of white light and with each sensitive layer colored prior to exposure with an image-forming dye of a color complementary to one of the primary colors.

Where the film is to be used for making a positive directly in natural colors, each layer of the film must be sensitized for the color which is absorbed by the image-forming dye in the same layer. This arrangement has, therefore, been called the "natural order" of sensitivity. A film of this type is disclosed in the U. S. patent to Christensen No. 1,517,049, granted November 25, 1924. In this type of film a silver image is formed by exposure, development, and fixation and the layer is then treated with a reducing agent which bleaches the dyes at the places where the negative silver image was formed. The dye remaining in the other portions of the layer thereby forms a positive colored image. In the use of certain types of dyes for coloring the layers, particularly the soluble azo dyes, certain difficulties are encountered in practice. These difficulties appear to result largely from the lowering of the photographic sensitivity of the spectral region absorbed by the image-forming dye which is especially objectionable, since this is precisely the region which each layer is intended to record. This lowering of the sensitivity is a serious defect in this type of process.

In another type of subtractive process employing pre-colored layers, each layer is sensitized for a spectral region transmitted by the same layer and also by the overlying layer or layers. If this condition is fulfilled, then although the layers are dyed the three colors complementary to the three primary colors of white light, and are sensitized for the three primary colors, a film of this type cannot be used to produce an image in natural colors by exposure in a camera to the subject or by printing directly from an original photograph in natural colors. Aside from the scale of greys, all the colors produced in the film will be of incorrect hue, since each layer is not sensitized for the color complementary to the same layer. Hence, the relation of color and sensitivity will be called a "false order" and the colors of the layers will be called "false colors" when the image produced in a layer transmits the spectral region recorded by the layer. Films of this type sometimes have one layer usually the bottom layer, sensitized to a spectral region outside of the visible spectrum, such as infra-red or ultra-violet in order that it may be exposed by radiation transmitted by the same layer and by the other two layers which together absorb substantially the entire visible spectrum. Such films are used only for printing, since they obviously could not be used in the camera. In still other films of this type, the layers may also be printed from opposite sides and may be coated on opposite sides of the support. In this case the printing of the different layers cannot be done simultaneously unless a special printer or color separation images are used.

It is, therefore, an object of the present invention to provide a material having pre-colored layers which may be used in an ordinary still or motion picture camera for obtaining an original color record in "false colors." A further object is to provide a method of obtaining natural color prints from such a record in "false colors" by one or more printing operations from one direction by the use of a material having pre-colored layers. Other objects will appear from the following description of my invention.

These objects are accomplished by the use of a special multi-layer film having at least the top layer uncolored or impermanently colored a light yellow and at least one lower layer colored in a definite relation to its sensitivity.

In the accompanying drawing Fig. 1 is a chart indicating the relation of the the primary colors and their complementary colors, arranged in the form of a circle;

Figs. 2, 3, 4 and 5 are enlarged sectional views of film made according to my invention and used in different steps of my improved process.

Fig. 6 represents a test object, and also the final image of such object as obtained by my improved process.

Figs. 7 and 8 represent images of the test object which are made as intermediate steps during the carrying out of the process.

For obtaining images in "false colors" from which prints may be made in natural colors, I have found that a material may be used having three superposed layers in which the top or outermost layer is blue-sensitive and the inner layers green-sensitive and red-sensitive, respectively. The green-sensitive layer may be colored either yellow or blue-green and the red-sensitive layer either magenta or yellow with dyes which may be bleached by a reducing agent in the presence of a silver image. Since all silver halide emulsions of even moderately high speed are sensitive to blue light, the top layer is the one exposed by blue light and is not color sensitized. It is not dyed, except that it may contain a moderate concentration of a removable yellow dye, such as tartrazine to screen the middle layer from the action of the blue rays. The second or intermediate layer transmits red and green, and it absorbs blue light so that it and the lowest layer are further screened against the action of blue light. The second layer is, therefore, yellow. This layer is sensitized for either red or green light. The lowest layer is either magenta or blue-green depending on the color finally introduced into the outer layer.

In Figs. 2 and 3 of the accompanying drawing, I have shown, in enlarged sectional views, films of this type. As shown in Fig. 2 the support 10 has coated thereon a gelatin-silver halide layer 11 sensitive to red light and colored with a magenta dye. On the layer 11 there is coated a gelatin-silver halide layer 12 sensitive to green light and colored with a yellow dye. On the layer 12, there is coated a gelatin-silver halide layer 13 sensitive to blue light and uncolored or else dyed with a yellow dye which can later be removed. This will be designated as material "A."

In the film shown in Fig. 3, the support 10 is coated with a gelatin silver-halide layer 14 sensitive to green light and colored with a blue-green dye. On this is coated a gelatin silver-halide layer 15 sensitive to red light and colored with a yellow dye. The final layer 16 is blue-sensitive and is uncolored or temporarily dyed a light yellow. This will be designated as material "B."

Other types of film material which I contemplate using in my process, but which are not in themselves new, are films having three superposed layers differentially sensitized to red, green and blue light and uncolored except for a yellow screening dye in or adjacent to the outermost blue sensitive layer and a magenta screening dye between the middle green-sensitive layer and the bottom red-sensitive layer. A film of this type is described in Patent 2,113,329, granted April 5, 1938 to L. D. Mannes and L. Godowsky, Jr. According to Patent 2,113,329 the film after exposure, is processed to colors which are complementary to the spectral regions which the various layers record. According to the present process this film, after exposure, is processed so that there is produced in each layer a color which is complementary to the spectral region which another layer records. For example, a film having layers sensitized, respectively, to red, green and blue light is exposed and colored so that the colors are respectively yellow, blue-green, and magenta. For the purposes of description, film processed in this way will be termed material "C." This type of film may also be exposed and processed so that the layers are respectively magenta, yellow and blue-green. This type of film will be termed material "D."

Up to this point nothing has been said regarding the color of the outermost layer of materials "A" (Fig. 2) and "B" (Fig. 3). In material "A" (Fig. 2), since the inner layers are colored yellow and magenta, the outermost layer will obviously be colored blue-green. When the material "A" (Fig. 2), having two pre-colored layers, is completely processed, there is obtained a positive in which only the scale of greys is reproduced in its natural hue. All other colors will have their hues altered but will nevertheless be recorded in varying densities of the three complementary colors. The varying intensity of blue light from the subject will be recorded in varying transparencies of blue-green dye instead of yellow, the varying density of green light from the subject will be recorded in varying transparencies of yellow dye instead of magenta and the varying intensity of red light will be recorded in varying transparencies of magenta dye instead of blue-green.

In order to obtain a positive in natural colors, two successive prints, one from the other, may be made from the original record on the material "A" (Fig. 2) onto the same material, or one print onto another suitable material. For this second purpose the materials "B" (Fig. 3) and "C" were devised. By printing the image on material "A" directly onto material "B" or "C," a positive in natural colors is obtained.

The printing onto material "C" involves no difficulties since all of the layers are uncolored (except for the light yellow and magenta filter dyes) and are sensitive to blue, green and red light in order from the front of the film. In the case of material "B" (Fig. 3) the intermediate yellow layer is sensitized to record red light. This involves some difficulty since most red sensitizers confer also a slight sensitivity in the green region. The difficulty may be overcome, however, by the use of certain infra-red sensitizers which sensitize also for the visual red without sensitizing for the green. When using this method for sensitizing the yellow layer of material "B" (Fig. 3), it is necessary either that the blue-green dye of material "A" (Fig. 2) does not transmit infra-red light or that if the blue-green used in the outer layer of material "A" does transmit infra-red, the infra-red component of the printing light must be removed. This can be done with a filter, but since it is difficult to make a stable filter that will absorb infra-red without absorbing visual red it is considered better to bring about spectral dispersion of the printing light, then to block off the infra-red component of the beam and finally to recombine the visual components for the actual printing.

Another method for sensitizing the yellow layer effectively for red light only, is to sensitize the emulsion for red in the ordinary way but to use for the green sensitive layer an emulsion which is much faster (for example, about 16 times) to green light than the emulsion which is sensitized for red. A sufficiently dense minus green filter may be then used in the printing or exposing beam to enable the green sensitive layer to be exposed or printed by green light without affecting the red-sensitive layer appreciably.

In addition to using "A" (Fig. 2) as a material for the original exposure and "B" (Fig. 3) as a printing material, it is also possible to use "B" as a material for the original exposure and "A" as a printing material. In fact any of the materials "A," "B," "C" and "D" may be used as original materials or as printing materials when combined with the proper original material. Thus "A" may be used as the original material to make prints on "B" or "C," "B" may be used as an original material to make prints on "A" or "D." "C" may be used as an original material to make prints on "A" or "D," and "D" may be used as a negative material to make prints on "B" or "C."

A reference to the color chart shown in Fig. 1 will help to illustrate the sensitivity order used in the material described above. The chart shows in the circle three sectors, representing the primary colors red, green and blue. Opposite each of these is its complementary, blue-green in the case of red, magenta in the case of green, and yellow in the case of blue. If the three layers of a film are sensitized to the primary colors, red, green and blue, and the images formed therein are colored in the complements of the primary colors, which are indicated adjacent to the primaries in Fig. 1, an image in natural colors will result when the film is processed by a reversal method. If a material is prepared in which the relation of sensitivity and color are only the primary colors in the color chart of Fig. 1, represented by rotating clockwise 120° so that the red sector is opposite complementary yellow, the blue sector is opposite complementary magenta, and the green sector is opposite complementary blue-green, an image in natural colors will not be obtained. This is the type of material which I have called "B." If the sectors on the chart of Fig. 1 be considered as rotated counter-clockwise 120° the material obtained will be that represented by material "A." If an original false color record produced on one of these two materials is printed upon the other of these materials, then an image in natural colors will result.

The chart of Fig. 1 may be used to illustrate a further feature of my invention together with Figs. 6, 7 and 8. If the sectors of Fig. 1 representing the primary colors are considered as rotated 120° in either direction and the material thus represented is used as an original material to make a record of the test subject represented in Fig. 6, an image in false colors is obtained. This would show the colors of Fig. 6 rotated through 120° so that they would appear as in Fig. 7. If this image is again printed onto the same material, the colors would be rotated another 120°, but a natural color image would not be obtained. Instead, the image would appear as in Fig. 8. However, by making a second print from the first print onto the same material, the colors would be again rotated 120° and a natural color image would be obtained as a result of the second printing. This would appear like the original test subject as in Fig. 6.

It is apparent, therefore, from what has been said in the preceding paragraph that when materials "A," "B," "C" or "D" are used as negative materials, prints in natural colors may be obtained by two successive printing operations onto the same material. It is understood in this description that a reversal process is used in each case.

A further type of material, "E," which I may use is that represented in Fig. 4 of the drawing. In this material, the support 10 is coated with a gelatin-silver halide emulsion layer 17 which is sensitive to red light and colored purple or magenta. Supported on this are layers 18, sensitive to green light and colored yellow, and 19 sensitive to blue light only and uncolored. It is seen that this material conforms to the description of material "A." However, a difference resides in the fact that the magenta dye used in the inner-most layer 17 is one which is convertable into a blue-green dye in the course of processing. As a result of this processing method, the dye subsequently introduced into the top layer must be magenta.

In use, material "D" differs from material "A" in that the color records made in the camera on "E," although not in natural colors, may be printed in natural colors in one step by the use of the same material for printing.

A further material, not new in itself, is designated as material "F." This material is the same before exposure as materials "C" and "D" but is processed so that the image in the red-sensitive layer is blue-green, the image in the green-sensitive layer is colored yellow and the image in the blue-sensitive layer is colored magenta. This material may be used as a printing material for material "E" (Fig. 4) or may be used in the camera as an original material and used to print onto material "E" as in the case of material "E" it would also be possible to use material "F" as both original and a printing material to form a natural color image in a single printing operation.

The following table summarizes the descriptions of materials "A" to "F" with reference to sensitivity and color of the layers.

*Material A (Fig. 2)*

| Top layer | Blue sensitive | Colorless or impermanently colored a light yellow but blue-green dye is introduced after exposure |
| Middle layer | Green sensitive | Yellow |
| Bottom layer | Red sensitive | Magenta |

*Material B (Fig. 3)*

| Top layer | Blue sensitive | Colorless or impermanently colored a light yellow but magenta dye is introduced after exposure |
| Middle layer | Red sensitive | Yellow |
| Bottom layer | Green sensitive | Blue-green |

*Material C*

| Top layer | Blue sensitive | Magenta image developed |
| Middle layer | Green sensitive | Blue-green image developed |
| Bottom layer | Red sensitive | Yellow image developed |

*Material D*

| Top layer | Blue sensitive | Blue-green image developed |
| Middle layer | Green sensitive | Yellow image developed |
| Bottom layer | Red sensitive | Magenta image developed |

*Material E (Fig. 4)*

| Top layer | Blue sensitive | Colorless or impermanently colored a light yellow but magenta dye is introduced after exposure |
| Middle layer | Green sensitive | Yellow |
| Bottom layer | Red sensitive | Magenta (or purple) converted to blue-green after exposure |

*Material F*

| Top layer | Blue sensitive | Magenta image developed |
| Middle layer | Green sensitive | Yellow image developed |
| Bottom layer | Red sensitive | Blue-green image developed |

The processing of the various materials referred to above will now be described.

After exposure materials "A" and "B" are processed according to the following steps:

*Step I*

Develop silver image.

*Step II*

Fix.

*Step III*

Treat with a solution which destroys the dyes in the presence of the silver image.

*Step IV*

Treat with a solution which converts the silver to a salt of silver soluble in sodium thiosulfate (Hypo).

*Step V*

Fix.

It is understood that washing steps are inserted by these various steps of chemical treatments but the washing steps are omitted here for the sake of simplicity. A reversed dye image is then introduced into the top layer by any of a number of methods.

The dye may be introduced into the top layer by diffusion. This preferably is done between Steps II and III so that a reversed dye image is formed in this layer in Step III. In the case of material "A" a blue-green dye such as Solophenyl Fast Blue-Green BL (Geigy Co.) in a solution slightly acidified with acetic acid is introduced into the layer by bathing the film for a sufficient time to dye the top layer a deep blue-green. Another dye that may be employed is Niagara Blue G Schultz, Farbstofftabellen, No. 497, if this is followed by a dilute solution of pyridine to improve its color as described later. Still a third example is Niagara Sky Blue, Schultz, Farbstofftabellen, No. 513.

According to another method, a bleach is used in Step IV which simultaneously bleaches the silver to a soluble silver salt and tans the gelatin in the regions of the silver image, so that after the final washing and drying operations a reversed dye image may be introduced by differential diffusion into the regions of the softer gelatin. A bleach of this type may have the following composition:

| | |
|---|---|
| Potassium bichromate_____grams__ | 3.25 |
| Acetic acid (glacial)_____cc__ | 20 |
| Potassium alum_____grams__ | 10 |
| Potassium ferricyanide_____do____ | 9.5 |
| Potassium bromide_____do____ | 6.9 |
| Water to_____liter__ | 1 |

However, after Step V when this method is used there will be dye images in the two lower layers only. The washed and preferably well-dried material is then treated with a dye having the property of dyeing the unhardened gelatin more rapidly than the hardened gelatin. By this means a reversed dye image is introduced into the top layer also. The depth of this final dyeing may be governed visually in order that the density of the third dye image may balance that of the first two. This may be done by controlling the length of time for which the film is submitted to the dye solution. A dye image of this type for use in material "A" is produced with Alizarine Uranol BB (Schultz Farbstofftabellen, No. 1209) used in a 2% solution at 110° F., or Anthraquinone Blue AB (DuPont Co.) used in a 2% solution at 110° F.

Another method is to introduce a leuco base, or dye components, into the top layer, from which the dye may be formed. For example the leuco compound formed by the reduction of Indanthrene Blue SG may be introduced into material "A" (Fig. 2) after developing and fixing by bathing the film in a solution of the leuco compound. This may be oxidized to the dye with a solution of sodium perborate and a bleached dye image subsequently formed in an alkaline stannite bath described in my prior Patent 2,184,022, granted December 19, 1939.

The processing of material "E" (Fig. 4) is carried out in a slightly different way since the magenta dye originally incorporated in the lowermost red sensitive layer is to be converted to a blue-green color. This may be accomplished in a number of ways. One method is to use a magenta dye which contains a free amino group. After exposure, development and fixation of the film this dye is diazotized and converted to a blue-green dye by coupling with a suitable phenolic substance which couples with the diazo group.

Another method of accomplishing this conversion of color of the innermost layer of material "E" (Fig. 4) is to use a dye which is transparent to red light and which may be converted to a blue-green dye by the use of a dilute solution of an organic base. A dye of this type is Niagara Blue G (Schultz, Farbstofftabellen No. 497). This dye is a purplish blue, but is sufficiently transparent to red light so that the red sensitive layer in which it is incorporated may be exposed by red light. The dye is then converted into a blue-green form by the use of a dilute solution of pyridine. In processing, the pyridine is incorporated in the fixing bath in place of the usual acid hardener, after which the magenta dye is introduced into the top layer by one of the methods described above. The composition of the fixing bath containing pyridine may be as follows:

| | |
|---|---|
| Sodium thiosulfate_____grams__ | 150 |
| Pyridine _____c.c__ | 5 |
| Water to_____liter__ | 1 |

The methods described above for obtaining colored images have been directed to the production of images in "false colors," that is, the layers are colored so that they transmit light of the color to which they are especially sensitive or are colored in this manner after exposure. I will now refer to a film using the natural order of sensitivity. A film of this type is shown in Fig. 5 of the drawing in which the support 10 is coated with a red sensitive layer containing a blue-green dye and on this in succession a green-sensitive layer 21 containing a magenta dye and an uncolored blue-sensitive layer 22. This latter layer may contain a yellow filter dye for the purpose of preventing action of the blue light on the red and green sensitive layers 20 and 21 which are also blue-sensitive. The filter dye may also be contained in a layer between layers 21 and 22.

As dyes for the layers 20 and 21 I may use the vat dyes described in my prior Patent 2,184,022, granted December 19, 1939. For example, the red-sensitive layer may be colored with a colloidally dispersed indigo and the green-sensitive layer with a colloidally dispersed Algol Pink BBK (Schultz, Farbstofftabellen No. 1221). The present method of coloring only two of the layers of a three-layer film using the natural order of sensitivity has some advantage over the method described in my Patent 2,184,022 in that the process of manufacture of the film is somewhat simplified, due to the fact that the top layer may be an ordinary blue-sensitive emulsion without the necessity of incorporating a colloidally dispersed vat dye therein. A further advantage is that the final adjustment of the color balance of the film may be made on a visual basis by controlling the duration of the application of the dye forming the image in the top layer.

The film using the natural order of sensitivity and vat dyes to color the inner layers may be processed according to the following steps:

Step 1.—Expose to a colored object from the emulsion side.
Step 2.—Develop.
Step 3.—Fix.
Step 4.—Bleach in a sodium stannite solution such as that described in Patent 2,184,022.
Step 5.—Convert the silver image to silver bromide by means of a solution of the composition already given:

| | |
|---|---|
| Potassium bichromate | grams 3.25 |
| Glacial acetic acid | c. c. 20 |
| Potassium alum | grams 10 |
| Potassium ferricyanide | do 9.5 |
| Potassium bromide | do 6.9 |
| Water to | liter 1 |

(This solution has the property of hardening the gelatin in the vicinity of the silver image in the top layer)

Step 6.—Fix.

Step 7.—Wash and dry thoroughly.

In the above outline of the processing method, some of the washing steps have been omitted. It is understood, however, that the film is washed between each of the processing steps described.

As a final step, a reversed yellow dye image is introduced by diffusion of a dye into the top layer. The dye used is one which diffuses very slowly into gelatin which has been hardened by the action of a bichromate bleach bath of the type described, such dye is Fastusol Yellow LR (General Dyestuff Corp.). A small amount of ammonia is preferably added to the dye solution to keep the highlights of the picture clear.

It will be understood that the film in which the natural order of sensitivity is used may be processed directly to an image in natural colors, and since the dyes are bleached in the region of the silver image a reversed positive dye image is produced.

The examples given in the above specification are for the purpose of illustration only and are not to be taken as restricting the invention. I may use other dyes and processing methods as well as other method of coloring and sensitizing the layers of the film and other features which are included within the scope of the appended claims.

It should be understood that although the photographic materials described in this specification are described as films, they may be coated upon paper, glass or other commonly used opaque and transparent supports as well as on transparent flexible film support.

What I claim:

1. A photographic element comprising a support having three superimposed emulsion layers on the same side of the support differentially sensitized for the three primary colors, two of which layers are dyed with different subtractive colors each transmitting freely a primary color, and the third of which layers is blue-sensitive and contains no image-forming dye and is located nearest the exposing light.

2. A photographic film comprising a support having on one side thereof three superposed emulsion layers differentially sensitive to regions of the spectrum corresponding to the primary colors, two adjacent layers of which are each colored a different color complementary to the primary color which another layer records and one layer of which is blue-sensitive and contains no image-forming dye being located nearest the exposing light.

3. A photographic element comprising a support having three superposed emulsion layers on the same side of the support the layer farthest from the support containing no image-forming dye, and being sensitive to blue light, the next layer containing a yellow image-forming dye and being sensitized for a primary color which it transmits, and the third layer containing an image-forming dye complementary in color to the primary for which the yellow layer is sensitized and being sensitized for the remaining primary color.

4. The method of producing three reversed dye images in a photographic element having three superposed layers on the same side of a single support, each sensitive to a different one of the three primary colors, the blue sensitive layer being outermost and the lower two of which layers have different image forming dyes uniformly incorporated therein, which includes exposing the element to a colored light image, developing silver images in all three layers, introducing an image forming dye into the top layer subsequent to exposure, and treating the element with a reducing agent that bleaches the dyes in at least the lower layers in the regions of the silver images and also bleaches the dye in the top layer in the regions of the silver image if a dye is present at the bleaching stage.

5. The method of producing three reversed dye images in a photographic element having three superposed layers on the same side of a single support, each sensitive to a different one of the three primary colors, the blue sensitive layer being outermost and the lower two of which layers have different image forming dyes uniformly incorporated therein, which includes exposing the element to a colored light image developing silver images in all three layers, introducing a third image forming dye by diffusion into the top layer subsequent to exposure but previous to a dye destroying bleach step, and treating the element with a reducing agent that bleaches the dyes in all three layers in the regions of the silver images.

6. The method of producing three reversed dye images in a photographic element having three superposed layers on the same side of a single support, each sensitive to a different one of the three primary colors, the blue sensitive layer being outermost and the lower two of which layers have different image forming dyes uniformly incorporated therein, which includes exposing the element to a colored light image, developing silver images in all three layers, treating the element with a reducing agent that bleaches image forming dyes in the two layers in the regions of the silver images, acting upon the silver image in the outer layer with a reagent that tans the gelatin in the regions of the silver image, and applying to the outermost layer of the element a dye that diffuses more rapidly into untanned gelatin than into tanned gelatin.

MERRILL W. SEYMOUR.

CERTIFICATE OF CORRECTION.

Patent No. 2,231,685.　　　　　　　　　　　　　　　　February 11, 1941.

MERRILL W. SEYMOUR.

It is hereby certified that error appears in the above numbered patent requiring correction as follows: In the heading to the printed specification, line 7, for "Serial No. 103,889" read --Serial No. 103,889. In Great Britain February 21, 1936--; and that the said Letters Patent should be read with this correction therein that the same may conform to the record of the case in the Patent Office.

Signed and sealed this 1st day of April, A. D. 1941.

Henry Van Arsdale,
(Seal)　　　　　　　　　　　　　　　　　　Acting Commissioner of Patents.